UNITED STATES PATENT OFFICE.

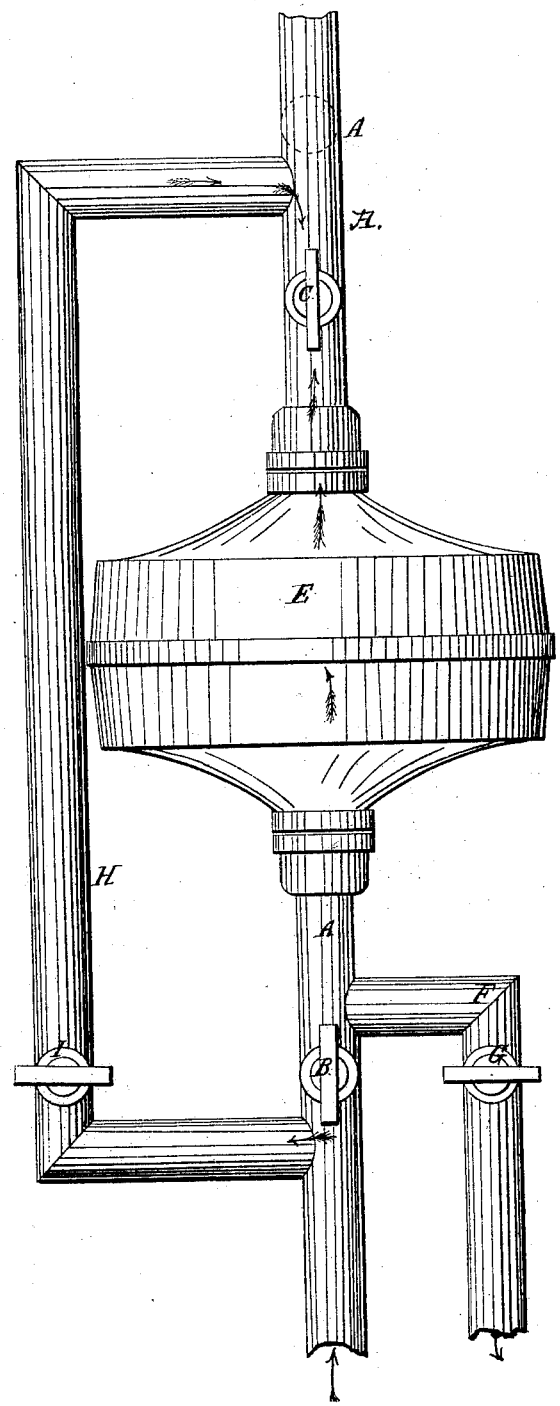

JAMES FERNALD, OF BOSTON, MASSACHUSETTS.

METHOD OF ATTACHING FILTERS TO SUPPLY-PIPES.

Specification of Letters Patent No. 16,330, dated January 6, 1857.

*To all whom it may concern:*

Be it known that I, JAMES FERNALD, of Boston, in the county of Suffolk and State of Massachusetts, have invented a new and useful Process for Filtering the Water of Hotels and other Large Establishments; and I do hereby declare that the same is fully described and represented in the following specification and the accompanying drawings, letters, figures, and references thereof.

To filter the water for hotels under present circumstances, requires that a portable filter shall be placed upon every service cock in the house, the expense of which is so great, and the necessary care requires so much time, that few if any hotels will introduce them. Now the water with which most of cities is supplied contains so many animal and vegetable impurities, that it is highly necessary that it should be filtered when it is to be used for drink, or for cooking.

It has been my object to filter such water in its process through the main house pipe, and before it reaches any of the service cocks. I have also wished at the same time to provide a ready means of cleansing filter, of drawing the water with a full head unobstructed by said filter when necessary, and of so applying the filter that it can be easily removed to be replaced or repaired.

These various objects I have successfully accomplished, as I will now proceed to describe by reference to the accompanying drawing, which represents an elevation of the arrangement of pipes, etc.

A, denotes the main water pipe, having two stop cocks B, C, applied to it as seen in the drawing.

E, represents a filter box, suitably supplied with filtering material; said filter box is connected or fastened to the two sections of the pipe A, by screws or screw couplings applied respectively to its upper and lower ends.

F, represents a waste pipe, joined to the pipe A, just above the cock B, and conducting into the drain of the house. A stop cock G, is applied to this pipe, as seen in the drawing.

Just below the lower cock B, an auxiliary pipe H, extends upward from the main pipe, and after passing by and above the filter, again unites or is connected with the main pipe just above the cock C. A stop cock I, is applied to this connecting or auxiliary pipe, as seen in the drawing.

The operation of the apparatus is as follows: The unfiltered water enters the main pipe A, and (the cocks B, C, of the main pipe being open, and the cocks G, I, of the waste and connecting pipes closed) is pressed upward through the filter, to the different parts of the house in a purified state. When the filter is supposed to have become clogged, we have only to close the cock B, and open the cock I, of the auxiliary pipe, and the cock G of the waste pipe. The waste will then rush up through the auxiliary H, into the section of the main pipe over the filter and down through the filter into and through the waste pipe F, carrying with it all the foreign vegetable and animal matters which have collected in the lower part of the filter. A few seconds will suffice to thoroughly cleanse the filter, when the cocks G, and I, may be again closed, and the cock B, opened, when the water will be again delivered in a filtered state. During the process of cleansing the filter there will be no interruption to the passage of the water into the rooms above, as the water will be forced upward as well as into the waste pipe F. If it is desirable to draw the water off at any time with its full head or force, unimpeded by the filter box, we close the cock B, and open the cock I, when the water will be delivered the same as if there were no filter. So if at any time we wish to remove the filter box, without interrupting the course of the water, or its delivery through the house, the filter can be so removed by closing the cocks B, and C, and opening the cock I. The filter may then be unscrewed and removed to be repaired or replaced by another. By closing the cock C, and opening the cock G, (the cock B, being open, and the cock I, shut) the water in in its full force will be impelled through the waste pipe F, thus serving to cleanse the drain of collected impurities.

The whole extra apparatus can be inclosed in a box, placed on the cellar floor and against the side of the wall (where the pipe enters the cellar) taking up but very little room and so as to be accessible at any time.

Thus it will be seen that by the simple use of one filter with a short auxiliary pipe, a short pipe leading into the waste pipe of the house, and four extra stop cocks all the water of any establishment may be filtered by one filter, while said filter may be easily cleansed. And at any time if desirable the said filter may be made inoperative and the water drawn with its full force. At present the water of all of our hotels is used in its impure state, as the addition of filters to all of the rooms would cost a large sum of money; while in private houses the water is not considered fit to use unless filtered. But with my apparatus any hotel can have its water filtered as easily as any small house, at but a trifling cost, and with but very little trouble as to attendance. A cock may be placed if necessary just above the upper point of connection of the auxiliary pipe, with the main pipe A, but this is not necessary as the service cock above being closed answers the same purpose. The waste pipe E, may be led out of the main pipe above the filter, though generally I prefer the arrangement I have represented.

Now what I claim as my invention, is—

The combination with the main water pipe of a house, of a filter, an auxiliary pipe, and a waste pipe, the pipes being provided with cocks, and the whole arranged substantially in manner and for the purpose as set forth.

In testimony whereof, I have hereto set my signature, this third day of April, A. D. 1856.

JAMES FERNALD.

Witnesses:
 FRANCIS GOULD,
 GEO. B. CHAMBERLIN.